(12) United States Patent
Yamamoto et al.

(10) Patent No.: US 8,446,596 B2
(45) Date of Patent: May 21, 2013

(54) SIGNAL PROCESSING APPARATUS USED FOR OPTICAL SIGNAL OUTPUT DEVICE AND OPTICAL DISPLACEMENT DETECTION SYSTEM

(75) Inventors: Eiji Yamamoto, Musashimurayama (JP); Jun Hane, Tokyo (JP); Hiromasa Fujita, Hachioji (JP)

(73) Assignee: Olympus Corporation, Tokyo (JP)

( * ) Notice: Subject to any disclaimer, the term of this patent is extended or adjusted under 35 U.S.C. 154(b) by 409 days.

(21) Appl. No.: 12/943,490

(22) Filed: Nov. 10, 2010

(65) Prior Publication Data
US 2011/0122422 A1    May 26, 2011

(30) Foreign Application Priority Data
Nov. 20, 2009    (JP) ................................. 2009-265517

(51) Int. Cl.
*G01B 11/14*    (2006.01)
(52) U.S. Cl.
USPC ......................................................... 356/614
(58) Field of Classification Search
USPC ...................................... 356/614; 250/559.29
See application file for complete search history.

(56) References Cited

U.S. PATENT DOCUMENTS

| | | | | |
|---|---|---|---|---|
| 4,373,816 A | * | 2/1983 | Laib | 356/623 |
| 2008/0068583 A1 | * | 3/2008 | Hiraide | 356/4.01 |
| 2011/0157578 A1 | * | 6/2011 | Hane et al. | 356/5.1 |

FOREIGN PATENT DOCUMENTS

JP    48-78959    10/1973

* cited by examiner

*Primary Examiner* — Roy M Punnoose
(74) *Attorney, Agent, or Firm* — Scully, Scott, Murphy & Presser, P.C.

(57) ABSTRACT

A signal processing apparatus includes a first signal processing unit and a second signal processing unit. The first signal processing unit executes a first predetermined operation with respect to first and second signal groups and to extract a first component having a predetermined characteristic when an optical signal output device is in a normal state, the first signal group whose amplitude or direct current component gradually increases with a predetermined direction displacement of a displacement detection target, the second signal group whose amplitude or direct current component gradually decreases with the predetermined direction displacement of the displacement detection target. The second signal processing unit executes a second predetermined operation with respect to the first and second signal groups and to extract an output containing a second component, which is peculiar to an optional position of the displacement detection target.

11 Claims, 7 Drawing Sheets

SIGNAL PROCESSING APPARATUS USED FOR OPTICAL SIGNAL OUTPUT DEVICE AND OPTICAL DISPLACEMENT DETECTION SYSTEM

CROSS-REFERENCE TO RELATED APPLICATIONS

This application is based upon and claims the benefit of priority from prior Japanese Patent Application No. 2009-265517, filed Nov. 20, 2009, the entire contents of which are incorporated herein by reference.

BACKGROUND OF THE INVENTION

1. Field of the Invention

The present invention relates to a signal processing apparatus which processes a signal from an optical signal output device for detecting a displacement of a displacement detection target. Further, the present invention relates to an optical displacement detection system which includes the signal processing apparatus and detects a displacement of a displacement detection target.

2. Description of the Related Art

The following technique is disclosed in, for example, Jpn. Pat. Appln. KOKAI Publication No. 48-78959 as a technique related to an optical displacement detection system, which detects a displacement of a displacement detection target. The foregoing Publication No. 48-78959 discloses a photoelectric detector. The photoelectric detector has a structure in which a slit or reflection plane is provided in line with a predetermined space with respect to a detection object, and detects an optical pulse resulting in the slit or reflection plane. Moreover, the photoelectric detector is configured so that the radial length of the slit or reflection plane becomes gradually large clockwise.

Figure 14:
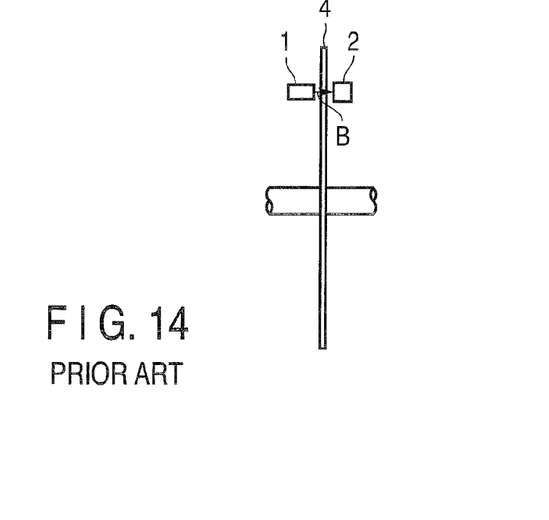
FIG. 14 is a side view showing an optical signal output device of a conventional photoelectric detector.

FIG. 14 is a side view showing an optical signal output device of the photoelectric detector (i.e., optical displacement detection system) disclosed in the foregoing Publication No. 48-78959. As seen from FIG. 14, a light beam B emitted from a light source 1 is irradiated on a slit of a detection object which is a scale 4, and then, the transmitted light is detected by a photodetector 2.

Figure 15:
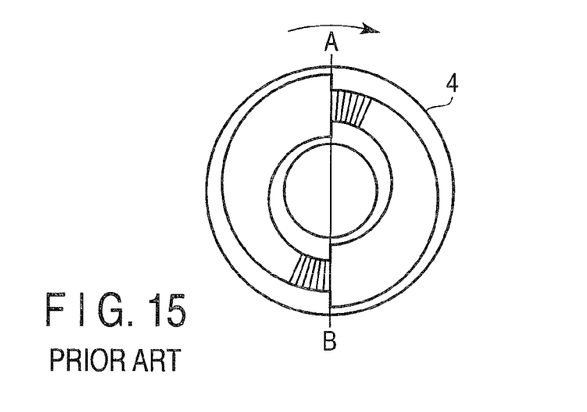
FIG. 15 is a top view showing a scale of a conventional photoelectric detector.

FIG. 15 is a top plan view showing the scale 4 in the photoelectric detector disclosed in the foregoing Publication No. 48-78959. As shown in FIG. 15, the radial length of the slit formed on the scale is increased or decreased with a predetermined space based on a reference position A or B as a reference with respect to the rotational direction shown by the arrow of FIG. 15 (FIG. 15 shows an example of increasing the radial length).

Figure 16:
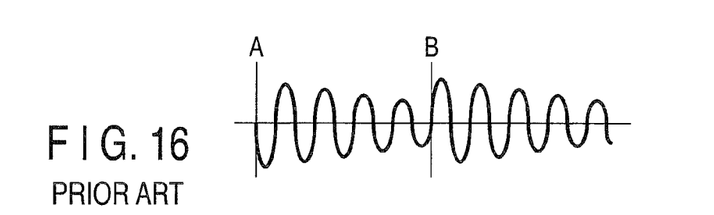
FIG. 16 is a view showing an output signal of a photodetector of conventional photoelectric detector.

FIG. 16 is a graph showing an output signal of a photodetector in the photoelectric detector disclosed in the foregoing Publication No. 48-78959. In the graph shown in FIG. 16, the horizontal axis takes a displacement (rotational angle) of a detection object, and the vertical axis takes an output of the photodetector 2. When the scale 4 is rotated counterclockwise, the aperture length of the slit is decreased. In this case, as seen from FIG. 16, the following characteristic appears; specifically, the amplitude of the output signal from the photodetector gradually decreases. The output signal having the foregoing characteristic is suitably operated using a signal processing apparatus, and thereby, it is possible to detect a rotational speed of a detection object. Moreover, a change of the amplitude is detected, and thereby, it is possible to detect a rotating direction of the scale 4.

The foregoing Publication No. 48-78959 does not have the following description. Specifically, according to the foregoing structure, the magnitude of an amplitude or direct current (DC) component of an output signal with respect to a rotating displacement is previously checked. Then, the amplitude or DC level of the output signal is measured, and thereby, it is possible to detect an absolute position from a reference position of a rotational angle of the scale 4. In this way, the photoelectric detector disclosed in the Publication No. 48-78959 is capable of detecting a kinematic direction and an absolute position of a detection object based on the amplitude of a detection signal, which changes with the movement of a detection object.

Here, in the technique disclosed in the Publication No. 48-78959, the output signal from the photodetector 2 has a DC component, which is affected considerably by an optical arrangement of the light source 1 and the scale 4, an output change of the light source and defect of the scale 4. In order to improve a detection sensitivity of an absolute position or to widen a detection range of the absolute position, the aperture length of the slit is set smaller. In this case, the smaller the minimum value of the aperture length of the slit is set, the more the amplitude of the output signal is reduced. Therefore, a noise component becomes relatively large in the output signal from the photodetector 2. As a result, the detection performance (resolving power, stability) is reduced at a portion where the aperture length of the slit is small.

Moreover, if the absolute position is detected using the configuration disclosed in the Publication No. 48-78959, there is a need to previously check an amplitude characteristic of an output signal from the photodetector 2 with respect to a rotating displacement. In this case, the amplitude characteristic of an output signal with respect to a rotating displacement changes resulting from environment, attaching shakiness of a sensor, an age-based change and defect on a scale, for example. For this reason, the detection accuracy and reliability are extremely low.

BRIEF SUMMARY OF THE INVENTION

An object of the present invention is to provide a signal processing apparatus used for an optical signal output device, which can keep a resolving power and stability of a positional detection over a wide displacement detection range at a high level while check the reliability considering an influence such as defect on a scale. Another object of the present invention is to provide an optical displacement detection system including the foregoing signal processing apparatus.

According to a first aspect of the invention, there is provided a signal processing apparatus used for an optical signal output device, comprising: a first signal processing unit configured to execute a first predetermined operation with respect to first and second signal groups and to extract a first component having a predetermined characteristic when an optical signal output device is in a normal state, the first signal group, which is output from the optical signal output device connected to a displacement detection target and whose amplitude or direct current component gradually increases with a predetermined direction displacement of the displacement detection target, the second signal group, which is output from the optical signal output device and whose amplitude or direct current component gradually decreases with the predetermined direction displacement of the displacement detection target; and a second signal processing unit configured to execute a second predetermined operation with respect to the first and second signal groups and to extract an output containing a second component, which is peculiar to an optional position of the displacement detection target.

According to a second aspect of the invention, there is provided an optical displacement detection system comprising: an optical signal output device comprising: (1) a scale, which is formed of first and second track patterns configured so that a direction parallel to a displacement direction of a displacement detection target is set as a longitudinal direction; (2) a light source configured to irradiate a light beam to the scale; and (3) a sensor head, which includes: a first photodetector detecting a light beam irradiated from the light source by means of the first track pattern to generate a first signal group in which an amplitude or direct current component gradually increases with a displacement of a predetermined direction of the displacement detection target; and a second photodetector detecting a light beam irradiated from the light source by means of the second track pattern to generate a second signal group in which an amplitude or direct current component gradually decreases with the displacement of the predetermined direction of the displacement detection target, the first track pattern, the second track pattern, the first photodetector, the second photodetector and the light source being arranged so that detection by the first photodetector is associated with detection of the second photodetector, and a signal processing apparatus comprising: (1) a first signal processing unit configured to execute a first predetermined operation with respect to the first and second signal groups and to extract a first component having a predetermined characteristic when the optical signal output device is in a normal state; and (2) a second signal processing unit configured to execute a second predetermined operation with respect to the first and second signal groups and to extract an output containing a second component, which is peculiar to an optional position of the displacement detection target, as a displacement of the displacement detection target.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL
VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Various embodiments of the present invention will be hereinafter described with reference to the accompanying drawings.

First Embodiment

Figure 1:
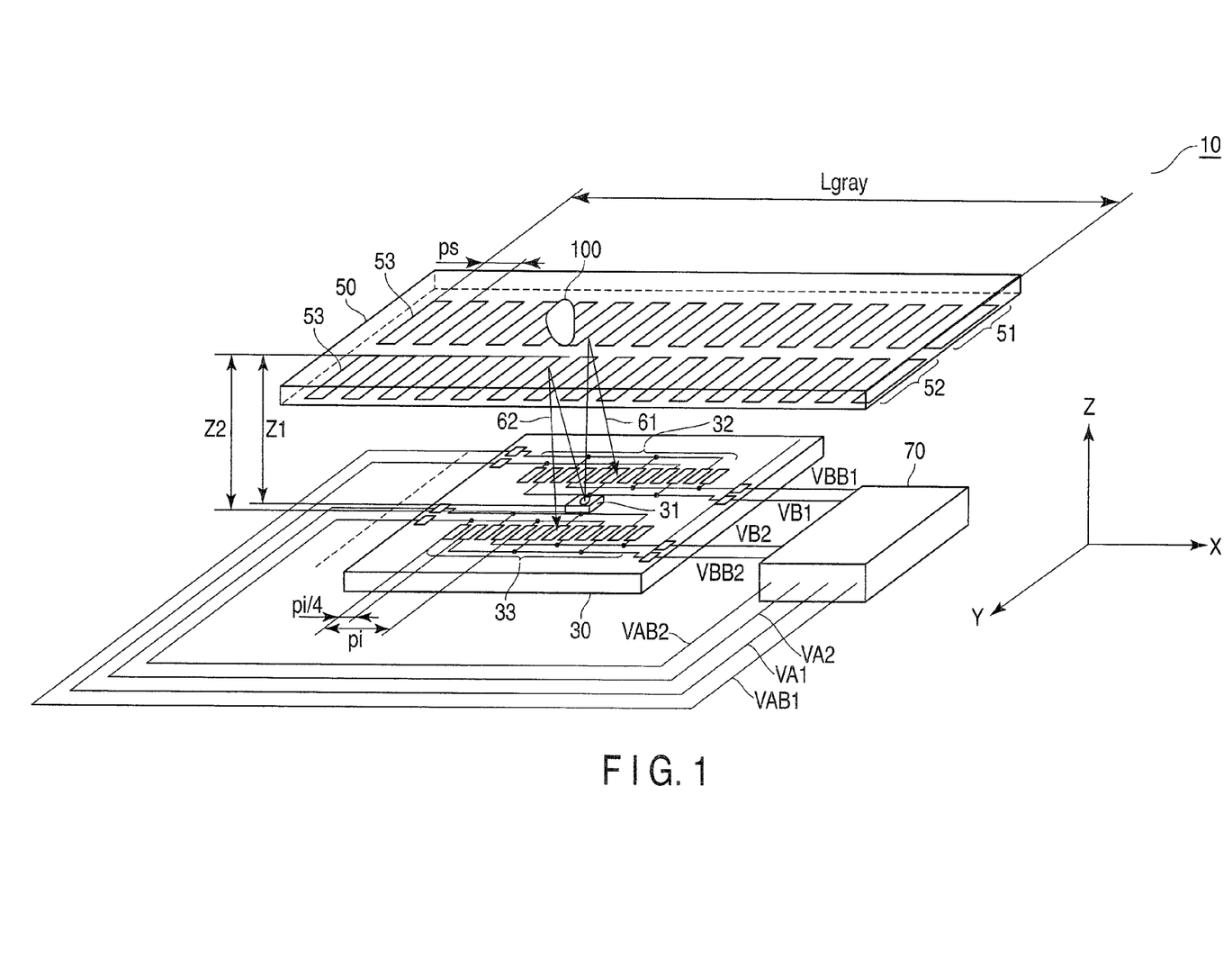
FIG. 1 is a perspective view showing the structure of an optical displacement detection system according to a first embodiment of the present invention.

A first embodiment of the present invention will be explained below. FIG. 1 is a perspective view showing the structure of an optical displacement detection system according to a first embodiment of the present invention.

As shown in FIG. 1, an optical displacement detection system 10 comprises an optical signal output device including a sensor head 30 and a scale 50, and a signal processing apparatus 70. In this case, one of the sensor head 30 and the scale 50 is connected to a displacement detection target, which is displaceable to a predetermined direction, while the other thereof is connected to a reference surface. According to this embodiment, the displacement direction of the displacement detection target is set as a direction (X-direction) along the X-axis shown in FIG. 1. Of course, the displacement direction of the displacement detection target may be set as a rotating direction around Z-axis shown in FIG. 1.

The sensor head 30 includes a light source 31, a first and second photodetectors 32 and 33. The light source 31 and each light-receiving surface of the first and second photodetectors 32 and 33 are arranged so that they are parallel with the scale 50 facing there.

The light source 31 includes a light source (e.g., laser diode) and a main body having a slit. The light source 31 irradiates light beams from the light source toward the scale 50 through the slits. According to this embodiment, the light source 31 is configured to irradiate light beams in two directions through the slits. In FIG. 1, one light beam is shown by reference number 61, and the other light beam is shown by reference number 62.

The first photodetector 32 has a light-receiving surface, which is formed with four groups of light-receiving element arrays. Each light-receiving array of the first photodetector 32 has a plurality of light-receiving element (e.g., photodiode). The light-receiving element converts a light beam 61, which is emitted toward the scale 50 and reflected by the scale 50, into an electric signal. Moreover, the second photodetector 33 has a light-receiving surface, which is formed with four groups of light-receiving element arrays. Each light-receiving array of the second photodetector 33 has a plurality of light-receiving element (e.g., photodiode). The light-receiving element converts a light beam 62, which is emitted toward the scale 50 and reflected by the scale 50, into an electric signal. A light-receiving element forming the light-receiving array of each group is formed at the same spatial period as a spatial period pi of an optical image (diffraction pattern), which is formed on each of the first and second photodetectors 32 and 33 by a reflected light from the scale 50. Further, the light-receiving array of each group is formed in a state of being shifted by pi/4. In FIG. 1, the light-receiving element forming the light-receiving array of each group is formed at the same spatial period as a spatial period pi of an optical image. Actually, the light-receiving element forming the light-receiving array of each group may be formed at a spatial period of positive integer multiples (1, 2, 3, . . . ) of the spatial period pi of an optical image.

In FIG. 1, four light-receiving arrays forming the first photodetector 32 are connected to the signal processing apparatus 70 by means of output terminals VA1, VB1, VAB1 and VBB1, respectively. Moreover, four light-receiving arrays forming the second photodetector 33 are connected to the signal processing apparatus 70 by means of output terminals VA2, VB2, VAB2 and VBB2, respectively.

The scale 50 is formed so that the displacement direction (X-direction in FIG. 1) of a displacement target is set to a longitudinal direction. The surface of the scale 50 facing the sensor head 30 is formed with a gray track 51 which is given as an example of a first track pattern, and a gray track 52 which is given as an example of a second track pattern.

So, terms related to a track pattern described below are defined. First, a "grayscale pattern" is defined as an optical pattern in which any of an effective reflectance, an effective transmittance and a diffraction efficiency gradually increases or decreases in a predetermined section along the displacement direction of the scale 50. Further, an "encode pattern" is defined as an optical pattern in which any of an effective reflectance, an effective transmittance and a diffraction efficiency periodically changes with respect to the displacement direction of the scale 50. Further, a "modulation code pattern" is defined as a pattern having an optical characteristic being combined the encode pattern and the grayscale pattern. Further, a "gray track" is defined as a track, which is formed of any of the grayscale pattern and the modulation pattern.

Considering the foregoing definition, each of gray tracks 51 and 52 shown in FIG. 1 is formed of a modulation code pattern. The modulation code pattern of gray track 51 is formed along the X-direction of FIG. 1 with a plurality of encode patterns 53, which have different effective reflectance so that an effective reflectance gradually increases for each spatial period ps. Moreover, the modulation code pattern of gray track 52 is formed along the X-direction of FIG. 1 with a plurality of encode patterns 53, which have different effective reflectance so that an effective reflectance gradually decreases for each spatial period ps. In this way, gray tracks 51 and 52 are formed, and thereby, the modulation code pattern forming gray track 51 and the modulation code pattern forming gray track 52 have an optical characteristic such that an effective reflectance is mirror-inverted.

Gray tracks 51 and 52 are not limited to the configuration shown in FIG. 1. For example, gray tracks 51 and 52 of FIG. 1 show the configuration example of a reflection-type optical signal output device. Namely, reflected light from the scale 50 of light beams 61 and 62 emitted from the light source 31 are detected by the first and second detectors 32 and 33. In contrast to the foregoing reflection type, the configuration example of a transmission-type optical signal output device may be used. Namely, transmitted light of light beams 61 and 62 emitted to the scale 50 from the light source 31 are detected by the first and second detectors 32 and 33. In this case, the modulation code pattern forming gray track 51 and the modulation code pattern forming gray track 52 have an optical characteristic so that an effective transmittance is inverted in a mirror. In addition, according to this embodiment, various gray track configurations are applicable. Namely, a spatial amplitude of an optical image formed on a light-receiving surface of the first or second photodetector 32 or 33 or the total quantity of light is modulated by reflected light, transmitted light or diffracted light of light beams 61 and 62 irradiated to the scale 50.

Figure 2:
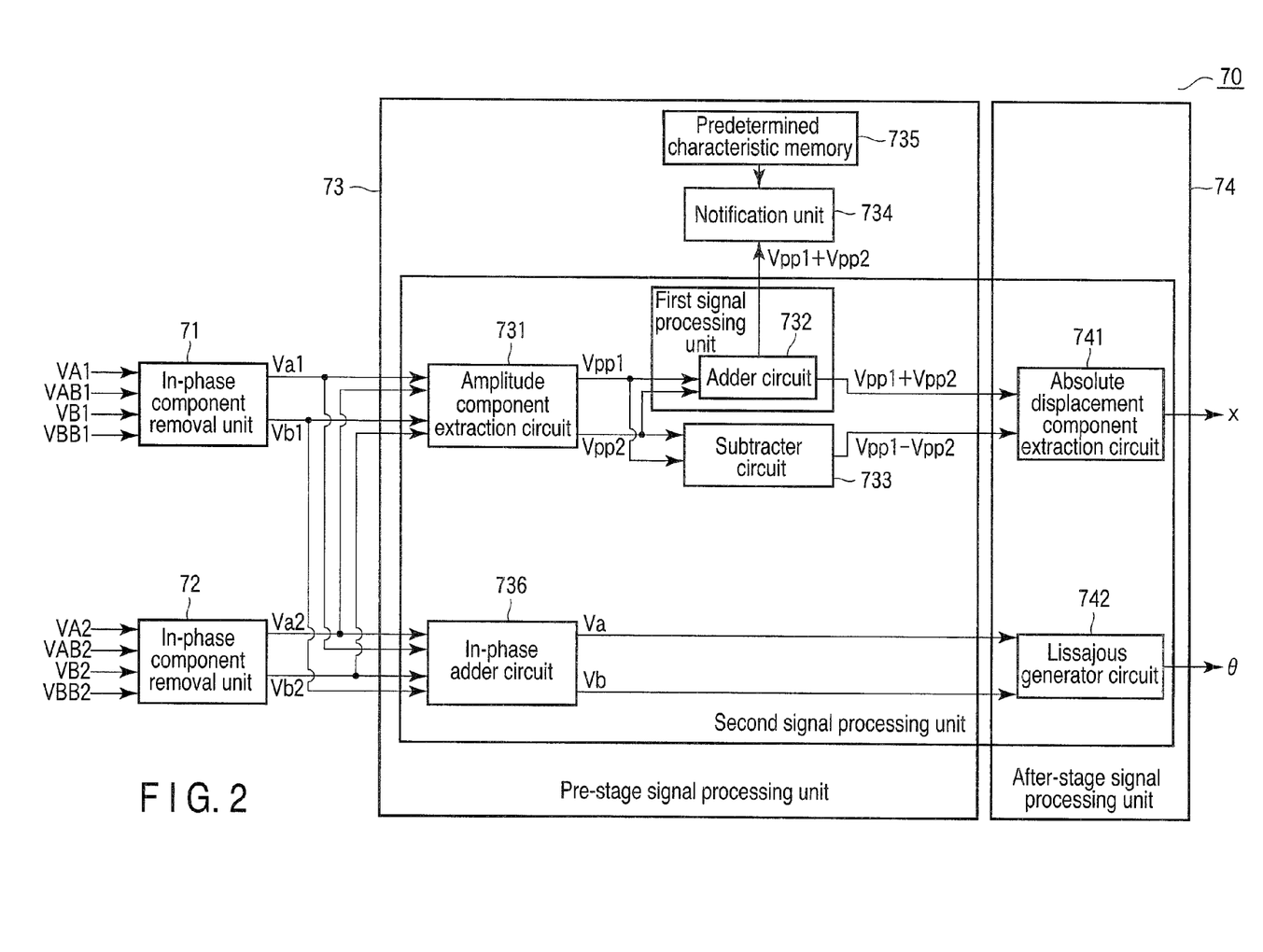
FIG. 2 is a block diagram showing the configuration of a signal processing apparatus.

The signal processing apparatus 70 processes a signal output from each of the first and second photodetectors 32 and 33 to detect a displacement of a displacement detection target. FIG. 2 is a block diagram showing the configuration of a signal processing apparatus 70. The signal processing apparatus 70 shown in FIG. 2 includes in-phase component removal units 71, 72, a pre-stage signal processing unit 73 and an after-stage signal processing unit 74.

The in-phase component removal unit 71 operates as a subtraction circuit which calculates the difference between signals mutually having a phase different by ½ of signals (first signal group) VA1, VB1, VAB1 and VBB1 output from output terminals VA1, VB1, VAB1 and VBB1 of the first photodetector 32. In this way, the unit 71 removes an in-phase offset component and noise. Moreover, the in-phase component removal unit 72 operates as a subtraction circuit which calculates the difference between signals mutually having a phase different by ½ of signals (second signal group) VA2, VB2, VAB2 and VBB2 output from output terminals VA2, VB2, VAB2 and VBB2 of the second photodetector 33. In this way, the unit 72 removes an in-phase offset component and noise.

The pre-stage signal processing unit 73 executes a first predetermined operation using output signals Va1 and Vb1 of the in-phase component removal unit 71 and output signals Va2 and Vb2 of the in-phase component removal unit 72. The unit 73 includes an amplitude component extraction circuit 731, an adder circuit 732, a subtracter circuit 733, a notification unit 734, a predetermined characteristic memory 735 and an in-phase adder circuit 736. In this case, the adder circuit 732 functions as an example of a "first signal processing unit".

The amplitude component extraction circuit 731 extracts an amplitude component Vpp1 of the signal from the first photodetector 32 and an amplitude component Vpp2 of the signal from the second photodetector 33 using outputs of in-phase component removal units 71 and 72.

The adder circuit 732 calculates the sum (Vpp1+Vpp2) of amplitude component Vpp1 of the signal from the first photodetector 32 and amplitude component Vpp2 of the signal from the second photodetector 33. Moreover, the subtracter circuit 733 calculates the difference (Vpp1−Vpp2) of amplitude component Vpp1 of the signal from the first photodetector 32 and amplitude component Vpp2 of the signal from the second photodetector 33.

The notification unit 734 determines whether or not an optical signal output device, that is, the sensor head 30 and the scale 50 are in a normal state based on an output signal (Vpp1+Vpp2) of the adder circuit 732. Then, the unit 734 notifies the determined result by means of a display output, for example. The predetermined characteristic memory 735 stores a predetermined characteristic for determining whether or not an optical signal output device, that is, the sensor head 30 and the scale 50 are in a normal state in the notification unit 734.

The in-phase adder circuit 736 has a plurality of input channels. The circuit 736 outputs Va=Va1+Va2 obtained by adding outputs Va1 and Vb1 of the in-phase component removal unit 71 and outputs Vb=Vb1+Vb2 obtained by adding outputs Va2 and Vb2 of the in-phase component removal unit 72.

The after-stage signal processing unit 74 executes a second predetermined operation for calculating a displacement using the result processed by the pre-stage signal processing unit 73. The unit 74 includes an absolute displacement component extraction circuit 741 and a Lissajous generator circuit 742.

The foregoing absolute displacement component extraction circuit 741 and Lissajous generator circuit 742 of the after-stage signal processing unit 74, and the foregoing amplitude component extraction circuit 731, adder circuit 732, subtracter circuit 733 and in-phase adder circuit 736 of the pre-stage signal processing unit 73 function as an example of a "second signal processing unit".

The absolute displacement component extraction circuit 741 executes a operation for calculating an absolute displacement x of a displacement detection target using outputs from adder circuit 732 and subtracter circuit 733. The Lissajous generator circuit 742 given as an example of a relative displacement operation unit generates a Lissajous figure using an output of the in-phase adder circuit 736. Then, the circuit 742 calculates θ corresponding to a relative displacement of a displacement detection target from the foregoing generated Lissajous figure.

The operation of the optical displacement detection system 10 shown in FIG. 1 will be explained below. First, in order to easily obtaining an understanding, the operation of the optical displacement detection system 10 when an optical signal output device is in a normal state will be explained below. According to this embodiment, a "normal state of an optical signal output device" means the following state. Specifically, gray track 51 or 52 on the scale 50 has no defects such as a foreign matter and scratch and various usage defects. Conversely, an "abnormal state of an optical signal output device" means the following state. Specifically, gray track 51 or 52 on the scale 50 has defects such as a foreign matter and scratch and various usage defects.

First, the signal output operation by the sensor head 30 and the scale 50 given as an optical signal output device will be explained. According to the structure shown in FIG. 1, light beams 61 and 62 emitted from the light source 31 are irradiated to gray tracks 51 and 52 formed on the scale 50. Light beam 61 irradiated to gray track 51 is reflected by gray track 51. In this way, an optical image (diffraction pattern) corresponding to a modulation code pattern forming gray track 51 is formed on a light-receiving element of the first photodetector 32. Likewise, light beam 62 irradiated to gray track 52 is reflected by gray track 52. In this way, an optical image (diffraction pattern) corresponding to a modulation code pattern forming gray track 52 is formed on a light-receiving element of the second photodetector 33.

The optical image corresponding to the modulation code pattern will be explained below. First, an optical image corresponding to an encode pattern 53 of the modulation code pattern will be explained. According to this embodiment, the principle of forming various optical images is applicable. In the following description, the optical image formation principle using the detection principle (Talbot image) by a point light source will be explained as a typical example.

In FIG. 1, the following settings are given. Specifically, the light source 31 is set as a point light source. Further, a Z-direction distance between the light source 31 and an encode pattern 53 on the scale 50 is set as Z1. Further, a Z-direction distance between a light-receiving surface (i.e., surface formed of light-receiving element) of the first or second photodetector 32 or 33 and an encode pattern 53 on the scale 50 is set as Z2. Further, a spatial period of the encode pattern 53 on the scale 50 is set as ps.

According to the foregoing settings, when light beams 61 and 62 are irradiated on a encode pattern 53 from the light source 31, each of these irradiated light beams 61 and 62 are reflected by the encode pattern 53. In this way, a periodically optical image having a spatial period pi is formed on light-receiving surfaces of the first and second photodetectors 32 and 33. In this case, in a Talbot image, the relationship shown by the following equation 1 is established.

$$pi = ps \cdot (Z1+Z2)/Z1 \quad (1)$$

In order to clearly form a periodically optical image having a spatial period pi on light-receiving surfaces of the first and second photodetectors 32 and 33, the following formation condition is required. Namely, there is a need to make the coincidence of pi, ps, Z1, Z2 and a light wavelength λ of the light source 31 with the formation condition of a Talbot optical image. However, according to this embodiment, the optical image generation principle is not limited to a Talbot image. Therefore, the detailed explanation of a process of determining pi, ps, Z1, Z2 and a light wavelength λ of the light source 31 is omitted.

As described above, each of the first and second photodetectors 32 and 33 is formed with four groups of light-receiving element arrays at a spatial period equivalent to the spatial period pi of the encode pattern 53. Each group is arranged in a state of being shifted by pi/4 along the spatial period direction. A light-receiving element array of each group detects light having a spatial phase difference shifted by ¼ period with respect to an optical image formed on a light-receiving surface having a spatial period pi. Therefore, output signals VA1, VB1, VAB1 and VBB1 of each light-receiving element array of the first photodetector 32 are provided as a periodic signal, which is shifted by 90° (i.e., ¼ period) at an electrical angle. Likewise, output signals VA2, VB2, VAB2 and VBB2 of each light-receiving element array of the second photodetector 33 are provided as a periodic signal, which is shifted by 90° at an electrical angle.

The output signal of the light-receiving element array corresponding to a modulation code pattern when a displacement detection target is displaced to the X-direction will be explained below. As described above, gray track 51 has an optical characteristic such that an effective reflectance gradually increases along the X-direction as a modulation code pattern. Conversely, gray track 52 has an optical characteristic such that an effective reflectance gradually decreases along the X-direction. So, when a displacement detection target is displaced by ps in the X-direction, each of light beams 61 and 62 from the light source 31 is irradiated to an encode pattern 53 on a position shifted by ps. In this way, optical images based on reflected light from the encode patterns 53 of the positions shifted by ps are formed on light-receiving surfaces of the first and second photodetectors 32 and 33. Thus, the amplitude of output signals VA1, VB1, VAB1 and VBB1 of each light-receiving element array of the first photodetector 32 increases. Conversely, the amplitude of output signals VA2, VB2, VAB2 and VBB2 of each light-receiving element array of the second photodetector 33 decreases. In other words, every when a displacement detection target is displaced by ps in the X-direction, output terminals VA1, VB1, VAB1 and VBB1 of each light-receiving element array of the first photodetector 32 output periodic signals VA1, VB1, VAB1 and VBB1. These periodic signals each have a characteristic having a phase difference by 90° (i.e., ¼ period) and a gradually increasing amplitude. On the other hand, output terminals VA2, VB2, VAB2 and VBB2 of each light-receiving element array of the second photodetector 33 output periodic signals VA2, VB2, VAB2 and VBB2. These periodic signals each have a characteristic having a phase difference by 90° (i.e., ¼ period) and a gradually decreasing amplitude. In this way, the amplitude of output signals VA2, VB2, VAB2 and VBB2 has the following characteristic with respect to the amplitude of output signals VA1, VB1, VAB1 and VBB1. According to the characteristic of amplitude, a sign of increase and decrease with displacement is reverse, and the absolute value of an amount of increase and decrease is equal, and further, the sum is constant.

The signal processing operation by the signal processing apparatus 70 will be explained below.

First, the removal of an in-phase noise component will be explained. The in-phase component removal unit 71 calculates the difference between signals having a ½ period (180°) phase mutually different of output signals VA1, VB1, VAB1 and VBB1 from the first photodetector 32. Namely, the in-phase component removal unit 71 executes an operation shown by the following equation (2).

$$Va1 = VA1 - VAB1$$

$$Vb1 = VB1 - VBB1 \quad (2)$$

Likewise, the in-phase component removal unit 72 calculates the difference between signals having a ½ period (180°) phase mutually different of output signals VA2, VB2, VAB2 and VBB2 from the second photodetector 33. Namely, the in-phase component removal unit 72 executes an operation shown by the following equation (3).

$$Va2 = VA2 - VAB2$$

$$Vb2 = VB2 - VBB2 \quad (3)$$

Figures 3A, 3B:
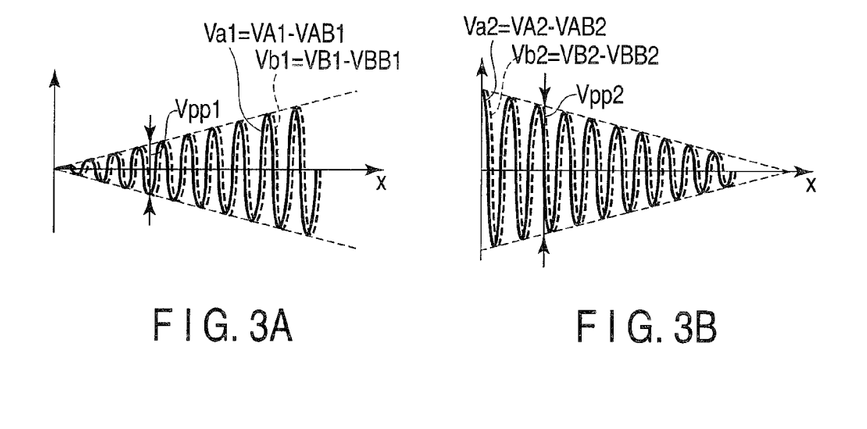
FIGS. 3A and 3B are views showing an example of an output characteristic of an in-phase component removal unit in a first embodiment of the present invention.

In-phase component removal units 71 and 72 execute the foregoing operation, and thereby, signals Va1 and Vb1 having a phase difference of 90° (i.e., ¼ period) shown in FIG. 3A are obtained from the in-phase component removal unit 71. Moreover, signals Va2 and Vb2 having a phase difference of 90° (i.e., ¼ period) shown in FIG. 3B are obtained from the in-phase component removal unit 72.

Figure 4:
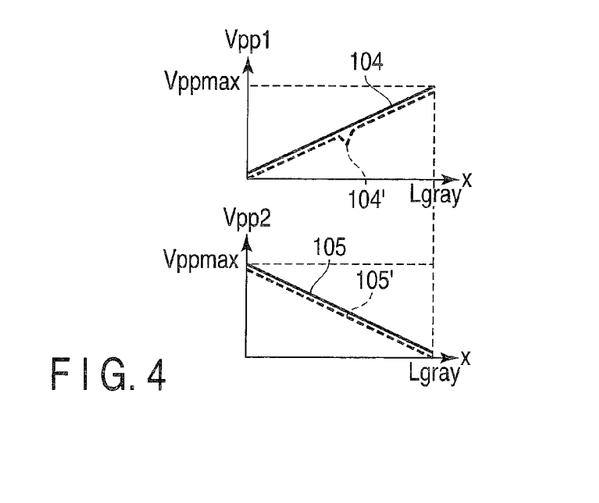
FIG. 4 is a view showing an example of an output characteristic of an amplitude component extraction circuit in a first embodiment of the present invention.

The absolute displacement detection of a displacement detection target by the signal processing apparatus 70 will be explained below. First, the amplitude component extraction circuit 731 extracts each of an amplitude component Vpp1 of the obtained signals Va1 and Vb1 shown in FIG. 3A and an amplitude component Vpp2 of the obtained signals Va2 and Vb2 shown in FIG. 3B. As described above, the modulation code pattern of gray track 51 has an optical characteristic such that an effective reflectance gradually increases along the X-direction of FIG. 1. Moreover, the modulation code pattern of gray track 52 has an optical characteristic such that an effective reflectance gradually decreases along the X-direction of FIG. 1. Therefore, amplitude component Vpp1 of signals output from the first photodetector 32 has a characteristic 104, which monotonically increases with respect to a displacement x, as shown in FIG. 4. Conversely, amplitude component Vpp2 of signals output from the second photodetector 33 has a characteristic 105, which monotonically decreases with respect to a displacement x, as shown in FIG. 4. In this case, amplitude components Vpp1 and Vpp2 are defined having the relationship shown by the following equations (4) and (5), respectively.

$$Vpp1 = a \cdot x \quad (4)$$

$$Vpp2 = -a \cdot (x - Lgray) \quad (5)$$

Where, Lgray is a length of a predetermined section in which an effective reflectance changes in gray tracks 51 and 52, and "a" is a change (i.e., gradient of Vpp1 shown in FIG. 4) of amplitude component Vpp1 when a displacement detection target is displaced by a unit distance.

When "Vppmax" is set as the maximum amplitude of signals output from the first and second photodetectors 32 and 33 in the predetermined section, the gradient "a" is obtained from the following equation (6).

$$a = Vpp\text{max}/Lgray \quad (6)$$

The amplitude component extraction circuit 731 extracts the amplitude component, and thereafter, the adder circuit 732 calculates the sum of Vpp1 and Vpp2 while the subtracter circuit 733 calculates the difference between Vpp1 and Vpp2. These operation results are expressed by the following equations (7) and (8).

$$Vpp1 + Vpp2 = a \cdot Lgray = Vpp\text{max} \quad (7)$$

$$Vpp1 - Vpp2 = 2a \cdot x - a \cdot Lgray \quad (8)$$

Figure 5:
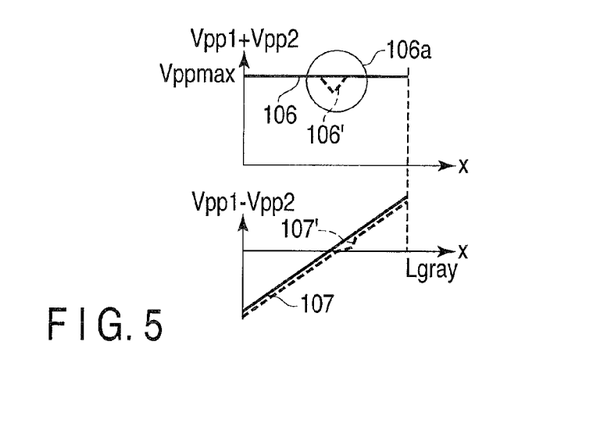
FIG. 5 is a view showing an example of each output characteristic of an adder circuit and a subtracter circuit in a first embodiment of the present invention.

The characteristic of equation (7) is shown by a characteristic 106 of FIG. 5, and the characteristic of equation (8) is shown by a characteristic 107 of FIG. 5. As seen from the characteristic shown in FIG. 5, a first component given as the sum of Vpp1 and Vpp2 becomes an approximately constant value "Vppmax" without depending on a displacement x.

Figure 6:
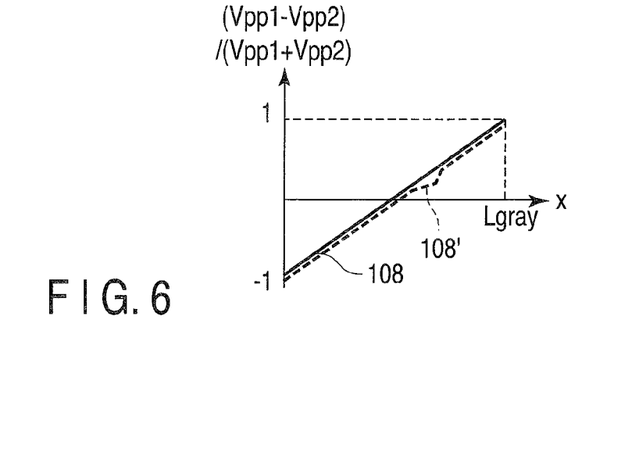
FIG. 6 is a view showing the characteristic of the ratio of the output of a subtracter circuit to the output of an adder circuit in a first embodiment of the present invention.

When a second predetermined operation is executed, that is, the ratio of (Vpp1−Vpp2) to (Vpp1+Vpp2) is calculated, a characteristic shown by reference number 108 of FIG. 6 is obtained. When the foregoing characteristic is expressed using a mathematical formula, the following equation (9) is obtained.

$$(Vpp1 - Vpp2)/(Vpp1 + Vpp2) = 2/Lgray \cdot x - 1 \quad (9)$$

When solving equation (9) for x, the following equation (10) is obtained.

$$x = Lgray \cdot ((Vpp1 - Vpp2)/(Vpp1 + Vpp2) + 1)/2 \quad (10)$$

As seen from the foregoing equation (10), if Lgray is previously measured, the absolute displacement component extraction circuit 741 can detect a displacement x. Moreover, as shown in equation (9), (Vpp1−Vpp2)/(Vpp1+Vpp2) is a value which does not depend on the maximum amplitude "Vppmax" and the gradient "a". Moreover, Lgray is a fixed value, which is determined when a scale 50 has been designed. Therefore, even if the maximum amplitude "Vppmax" and the gradient "a" change during the operation of the optical displacement detection system 10, the displacement x of equation (10) is unchanged. Moreover, there is a possibility that a value of (Vpp1+Vpp2) and a value of (Vpp1−Vpp2)

change resulting from a change of a quantity of light of the light source 31 and the arrangement of the light source 31 and the scale 50. However, according to the first embodiment, the ratio of (Vpp1−Vpp2) to (Vpp1+Vpp2) is used; therefore, the foregoing change is cancelable. Therefore, the displacement x is stably detectable.

According to this embodiment, a second predetermined operation is executed, and thereafter, a second component depending on the displacement only is extracted. In this case, the second component is equivalent to the relationships shown by the foregoing equations (9) and (10), typically. So long as a value depending on the displacement only is obtained after a predetermined operation is executed, various values are usable as a second component.

The relative displacement detection of a displacement detection target by the signal processing apparatus 70 will be explained below. First, the in-phase adder circuit 736 adds two signals having a ¼ period phase shown in FIGS. 3A and 3B every in-phase signal. Namely, the in-phase adder circuit 736 executes an operation shown by the following equation (11).

$$Va = Va1 + Va2$$

$$Vb = Vb1 + Vb2 \quad (11)$$

Figure 7:
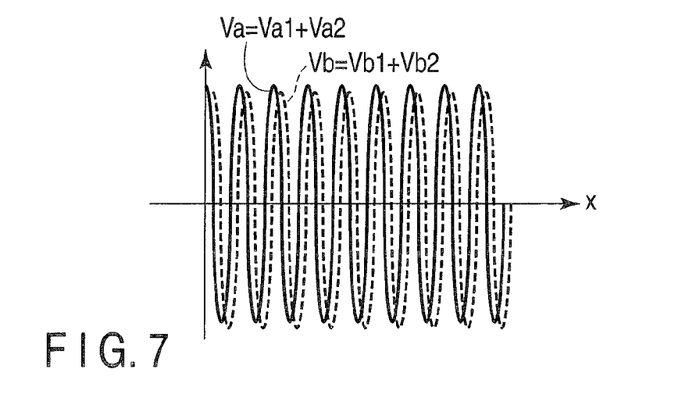
FIG. 7 is a view showing an example of an output characteristic of an in-phase addition circuit in a first embodiment of the present invention.

Thus, signals Va and Vb having a phase difference of 90° (i.e., ¼ period) shown in FIG. 7 are obtained from the in-phase adder circuit 736.

Figure 8:
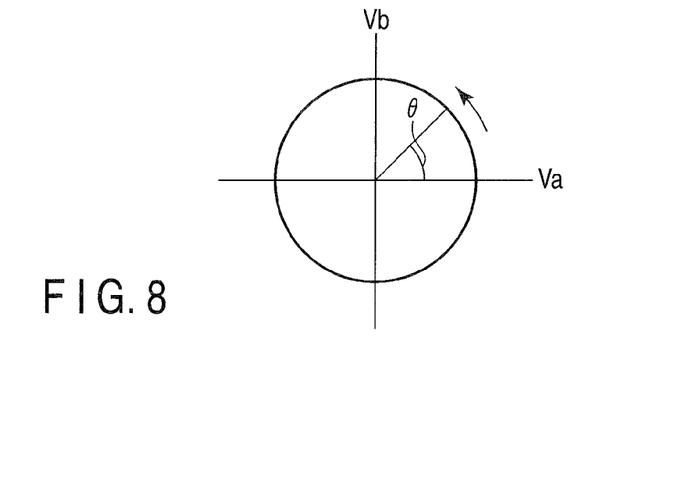
FIG. 8 is a view showing an example of a Lissajous figure generated by a Lissajous generator circuit in a first embodiment of the present invention.

The in-phase adder circuit 736 executes the foregoing operation, and thereafter, the Lissajous generator circuit 742 generates a Lissajous figure. FIG. 8 is a view showing an example of a Lissajous figure generated by the Lissajous generator circuit 742. As illustrated in FIG. 8, the Lissajous figure is a circle, which has a constant radius and rotates. A phase angle θ on the circumference of the circle is equivalent to a displacement x in a spatial period ps.

Figure 9A:
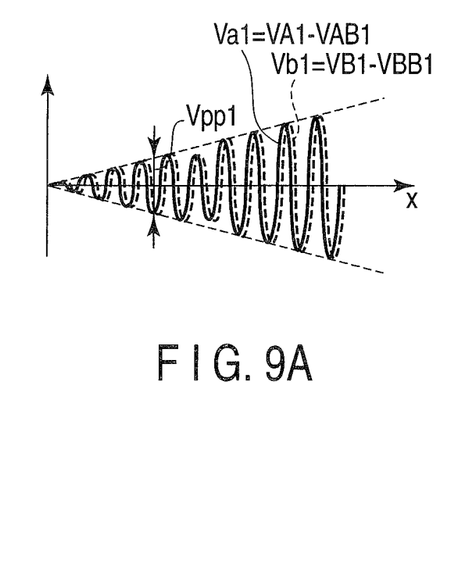
FIGS. 9A and 9B are views showing an example of an output characteristic of an in-phase component removal unit when an optical signal output device is in an abnormal state in a first embodiment of the present invention.
Figure 9B:
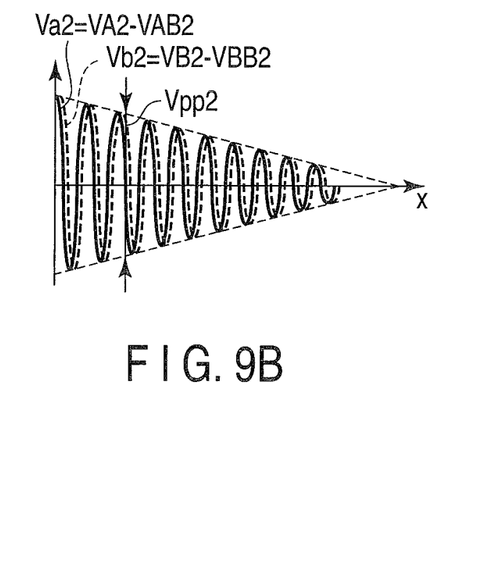

The operation of the optical displacement detection system 10 when an optical signal output device is in an abnormal state will be explained below. The case where a foreign matter 100 adheres on gray track 51 as shown in FIG. 1 is given as an example. In this case, reflection of light beam 61 is blocked by the foreign matter 100; for this reason, a quantity of light incident on the light-receiving element array of the first photodetector 32 is reduced. Therefore, the characteristic of amplitude Vpp1 of a signal from the first photodetector 32 is as shown in FIG. 9A. Namely, the characteristic of amplitude Vpp1 changes to a characteristic such that the amplitude intensity is reduced on the position of the foreign matter 100. On the other hand, the characteristic of amplitude Vpp2 of a signal from the second photodetector 33 is as shown in FIG. 9B; therefore, it is the same as the characteristic shown in FIG. 3B.

As a result, the output (Vpp1+Vpp2) of the adder circuit 732 has a characteristic 106' shown in FIG. 5. Namely, the characteristic line is formed with a concave portion at a portion 106a corresponding to the position of the foreign matter 100. Moreover, the output (Vpp1−Vpp2) of the subtracter circuit 733 has a characteristic 107' shown in FIG. 5. Namely, a level is reduced at a portion corresponding to the position of the foreign matter 100. As a result, the ratio of (Vpp1−Vpp2) to (Vpp1+Vpp2) has a characteristic 108' shown in FIG. 6. Namely, a level is reduced at a portion corresponding to the position of the foreign matter 100.

As described above, when an optical signal output device is in a normal state, (Vpp1+Vpp2) becomes constant as shown by the characteristic 106 of FIG. 5. Therefore, the output (Vpp1+Vpp2) of the adder circuit 732 is compared with the output (a·Lgray=Vppmax) of the adder circuit 732 when an optical signal output device is in a normal state. In this way, it is possible to determine whether or not an optical signal output device is in a normal state.

The notification unit 734 executes the foregoing comparison. Specifically, the notification unit 734 compares a predetermined value Vppmax previously stored in the predetermined characteristic memory 735 with (Vpp1+Vpp2) output from the adder circuit 732. If the difference between Vppmax and (Vpp1+Vpp2) is less than a predetermined value, a message that an optical signal output device is in a normal state is notified by means of display output for example. Conversely, if the difference between Vppmax and (Vpp1+Vpp2) is more than a predetermined value, a message that an optical signal output device is in an abnormal state is notified by means of display output. In this case, according to the degree of the difference between Vppmax and (Vpp1+Vpp2), it is possible to detect an influence given to a detection accuracy by adhesion of a foreign matter 100. Therefore, the notification unit 734 may be configured to notify an influence given to a detection accuracy by adhesion of a foreign matter 100 based on the degree of the difference between Vppmax and (Vpp1+Vpp2).

Moreover, the foregoing comparison by the notification unit 734 is applicable to various modification examples. Namely, "a predetermined characteristic when an optical signal output device is in a normal state, that is, first component" may be an index for easily determining whether the device is in a normal or abnormal state. Therefore, for example, amplitude component characteristics 104 and 105 when the device is in a normal state shown in FIG. 4 are previously stored. Then, these characteristics 104 and 105 may be compared with outputs Vpp1 and Vpp2 of the amplitude component extraction circuit 731, respectively. Besides, the output of the subtracter circuit 733 or the output of the absolute displacement component extraction circuit 741 may be used for the comparison.

As described above, according to the first embodiment, light beams 61 and 62 are irradiated to the scale 50, which is formed with gray tracks 51 and 52. Gray track 51 is formed of a modulation code pattern having an optical characteristic such that an effective reflectance gradually increases along a displacement direction of a displacement detection target. Gray track 52 is formed of a modulation code pattern having an optical characteristic such that an effective reflectance gradually decreases along a displacement direction of a displacement detection target. Then, reflected light from gray tracks 51 and 52 are individually detected by the first and second photodetectors 32 and 33. Further, a second predetermined operation is executed using output signals from the first and second photodetectors 32 and 33; in this way, it is possible to extract a second component depending on the displacement x only. Therefore, the displacement x is stably detectable.

Moreover, a first predetermined operation is executed using the output signal from the first photodetector 32 and the output signal from the second photodetector 33. In this way, it is possible to extract a first component, which becomes approximately constant without depending on a displacement x when an optical signal output device is in a normal state. Therefore, this serves to easily check the reliability considering an influence such as an abnormal state and defects on the scale 50.

According to the first embodiment, four-phase signals are obtained from each of the first and second photodetectors 32 and 33. In this case, four-phase signals may not be necessarily obtained. For example, if an influence by noise is not considered, signals VA1 and VB1 may be obtained from the first photodetector 32 while signals VA2 and VB2 may be obtained from the second photodetector 33.

Second Embodiment

Figure 10:
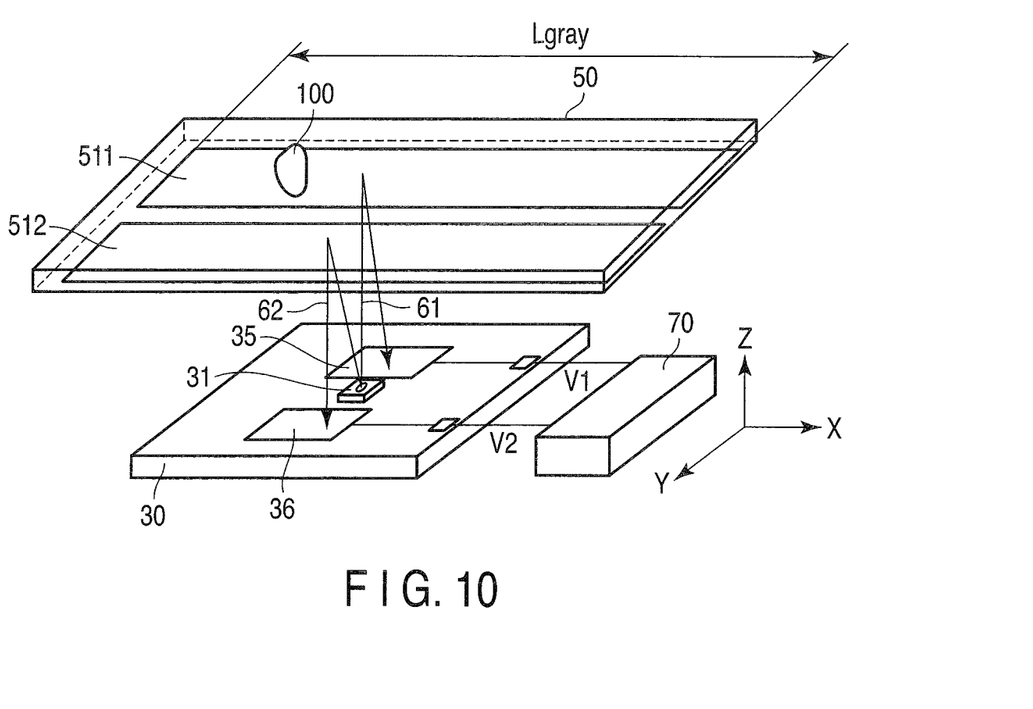
FIG. 10 is a perspective view showing the structure of an optical displacement detection system according to a second embodiment of the present invention.

A second embodiment of the present invention will be explained below. FIG. 10 is a perspective view showing the structure of an optical displacement detection system according to a second embodiment of the present invention. The first embodiment relates to the case where both of gray track 51 given as an example of a first track pattern and gray track 52 given as an example of a second track pattern are formed of a modulation code pattern. The second embodiment differs from the first embodiment in that two gray tracks are individually formed of gray scale patterns 511 and 512. In this case, the grayscale pattern 511 has an optical characteristic such that an effective reflectance continuously increases along the X-direction of FIG. 10. On the other hand, the grayscale pattern 512 has an optical characteristic such that an effective reflectance continuously decreases along the X-direction of FIG. 10.

In accordance with the foregoing change of gray tracks, first and second photodetectors are each formed of light-receiving elements 35 and 36, and not a light-receiving element array. In this case, the entire surface of each photodetector is formed as one light-receiving element. An output terminal of the first photodetector is V1 only. The output terminal V1 is connected to a signal processing apparatus 70. Likewise, an output terminal of the second photodetector is V2 only. The output terminal V2 is connected to a signal processing apparatus 70. In the second embodiment, the configuration of the signal processing apparatus 70 is omitted in its illustration. In the signal processing apparatus 70, in-phase component removal units 71 and 72, amplitude component extraction circuit 731, in-phase adder circuit 736 and Lissajous generator circuit 742 are omitted from the configuration shown in FIG. 2.

Hereinafter, the operation of an optical displacement detection system 10 shown in FIG. 10 will be described. First, the operation of the optical displacement detection system 10 when an optical signal output device is in a normal state will be explained. In the optical displacement detection system 10 shown in FIG. 10, a signal V1 output from light-receiving element 35 of the first photodetector has a characteristic 104 shown in FIG. 11 when a displacement detection target is displaced to the X-direction. The characteristic 104 of FIG. 11 corresponds to the characteristic of amplitude component Vpp1 shown in the characteristic of FIG. 4. Moreover, a signal V2 output from light-receiving element 36 of the second photodetector has a characteristic 105 shown in FIG. 11. The characteristic 105 of FIG. 11 corresponds to the characteristic of amplitude component Vpp2 shown in the characteristic of FIG. 4.

The adder circuit 732 calculates the sum of V1 and V2 as a first predetermined operation to extract a first component. Moreover, the subtracter circuit 733 calculates the difference between V1 and V2. The adder circuit 732 has an output characteristic 106 of FIG. 12, and the subtracter circuit 733 has an output characteristic 107 of FIG. 12. As can be seen from the characteristic 106 of FIG. 12, the sum of V1 and V2, that is, the first component becomes an approximately constant value Vmax without depending on a displacement x.

Figure 13:
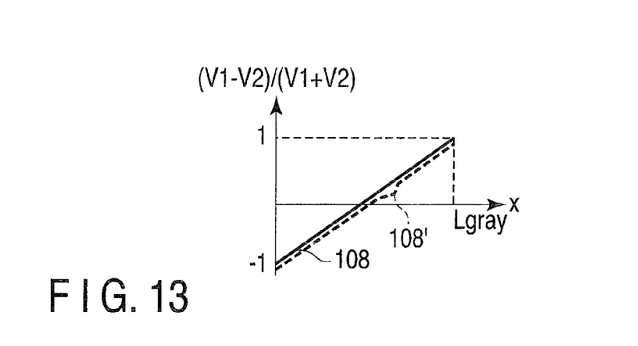
FIG. 13 is a view showing the characteristic of the ratio of the output of a subtracter circuit to the output of an adder circuit in a second embodiment of the present invention.

When the ratio of (V1−V2) to (V1+V2) is calculated as a second predetermined operation, a characteristic 108 of FIG. 13 is obtained. The characteristic 108 corresponds to the characteristic 108 shown in FIG. 6. Namely, in the foregoing equation (9), Vpp1 and Vpp2 are replaced with V1 and V2, respectively. These values of the foregoing (V1+V2) and (V1−V2) have a possibility of being changed due to various factors such as a change of the quantity of light of the light source and the arrangement of the light source 31 and 50. However, according to the second embodiment, the ratio of (V1−V2) to (V1+V2) is taken, and thereby, the foregoing change is cancelable. In this way, an absolute displacement component extraction circuit 741 can stably detect a displacement x.

The following is an explanation of the operation of the optical displacement detection system when an optical signal output device is in an abnormal state. A signal V1 output from light-receiving element 35 of the first photodetector has a characteristic 104' shown in FIG. 11 when a displacement detection target is displaced to the X-direction. Moreover, a signal V2 output from light-receiving element 36 of the second photodetector has a characteristic 105' shown in FIG. 11. As can be seen from the characteristic 104' of FIG. 11, the signal intensity locally changes at a position of a foreign matter 100. Thus, the output (V1+V2) of the adder circuit 732 has a characteristic 106' shown in FIG. 12. Namely, a concave portion is formed at a portion 106a where a foreign matter 100 adheres. Moreover, the output (V1−V2) of the subtracter circuit 733 has a characteristic 107' shown in FIG. 12. Namely, a level is reduced at a portion corresponding to the position where the foreign matter 100 adheres. As a result, the ratio of (V1−V2) to (V1+V2) has a characteristic 108' shown in FIG. 13. Namely, a level is reduced at a portion corresponding to the position where the foreign matter 100 adheres.

Figure 12:
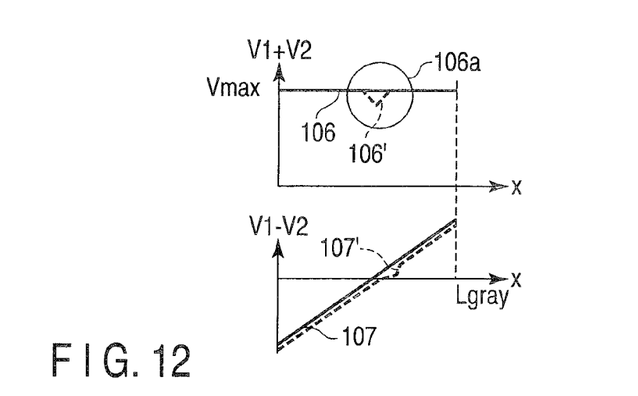
FIG. 12 is a view showing an example of each output characteristic of an adder circuit and a subtracter circuit in a second embodiment of the present invention.

As can be seen from the characteristic 106 of FIG. 12, (V1+V2) becomes approximately constant when an optical signal output device is in a normal state. Therefore, the output (V1+V2) of the adder circuit 732 is compared with the output Vmax of the adder circuit 732 when an optical signal output device is in a normal state. In this way, it is possible to determine whether or not an optical signal output device is in a normal state.

A notification unit 734 executes the foregoing comparison. The notification unit 734 compares a predetermined value Vmax previously stored in a predetermined characteristic memory 735 with the output from the adder circuit 732. If the difference between Vmax and (V1+V2) is less than a predetermined value, a message that an optical signal output device is in a normal state is notified by means of display output, for example. Conversely, if the difference between Vmax and (V1+V2) is more than a predetermined value, a message that an optical signal output device is in an abnormal state is notified by means of display output. In this case, in accordance with the degree of the difference between Vmax and (V1+V2), it is possible to detect an influence given to a detection accuracy by adhesion of the foreign matter 100. Therefore, based on the degree of the difference between Vmax and (V1+V2), the notification unit 734 may notify an influence given to a detection accuracy by adhesion of the foreign matter 100.

Figure 11:
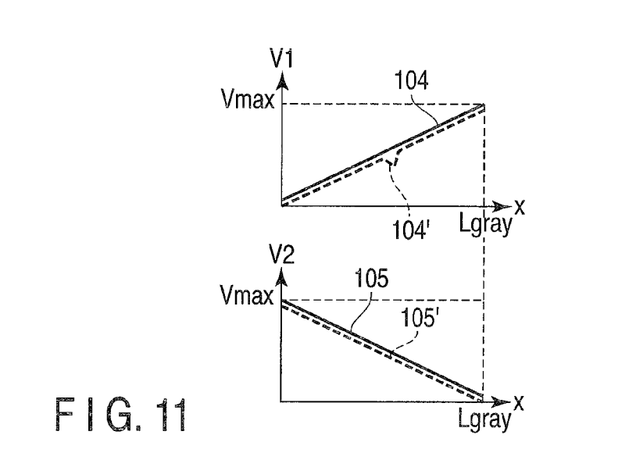
FIG. 11 is a view showing an example of an output characteristic of a light-receiving element in a second embodiment of the present invention.

Moreover, the foregoing comparison by the notification unit 734 is applicable to various modification examples. Namely, "a predetermined characteristic when an optical signal output device is in a normal state, that is, first component" may be an index for easily determining whether the device is in a normal or abnormal state, as described in the first embodiment. Therefore, for example, amplitude component characteristics 104 and 105 when the device is in a normal state shown in FIG. 11 are previously stored. Then, these characteristics 104 and 105 may be compared with outputs V1 and V2, respectively. Besides, the output of the subtracter circuit 733 or the output of the absolute displacement component extraction circuit 741 may be used for the comparison.

As described above, according to the second embodiment, light beams 61 and 62 are irradiated to the scale 50, which is formed with two gray tracks formed of grayscale patterns 511 and 512. The grayscale pattern 511 has an optical characteristic such that an effective reflectance continuously increases along a displacement direction of a displacement detection target. The grayscale pattern 512 has an optical characteristic such that an effective reflectance continuously decreases along a displacement direction of a displacement detection target. Then, reflected light from each gray track is individually detected using light-receiving elements 35 and 36 independent from each other. Further, a second predetermined operation is executed using output signals from these light-receiving elements 35 and 36; in this way, it is possible to extract a second component depending on the displacement x only. Therefore, the displacement x is stably detectable.

Moreover, a first predetermined operation is executed using the output signal from the foregoing light-receiving elements 35 and 36. In this way, it is possible to extract a first component, which becomes approximately constant without depending on a displacement x when an optical signal output device is in a normal state. Therefore, this serves to easily check the reliability considering an influence such as an abnormal state and defects on the scale 50.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A signal processing apparatus used for an optical signal output device, comprising:
    a first signal processing unit configured to execute a first predetermined operation with respect to first and second signal groups and to extract a first component having a predetermined characteristic when an optical signal output device is in a normal state, the first signal group, which is output from the optical signal output device connected to a displacement detection target and whose amplitude or direct current component gradually increases with a predetermined direction displacement of the displacement detection target, the second signal group, which is output from the optical signal output device and whose amplitude or direct current component gradually decreases with the predetermined direction displacement of the displacement detection target; and
    a second signal processing unit configured to execute a second predetermined operation with respect to the first and second signal groups and to extract an output containing a second component, which is peculiar to an optional position of the displacement detection target.

2. The apparatus according to claim 1, further comprising:
    a notification unit configured to compare a first component actually extracted by the first signal processing unit with the predetermined characteristic to determine whether or not there is a difference between the first component and the predetermined characteristic, and to notify whether or not the optical signal output device is in a normal state in accordance with the compared result, or to notify a degree of the difference between the first component actually extracted by the first signal processing unit and the predetermined characteristic in accordance with the compared result.

3. The apparatus according to claim 1, wherein the first signal processing unit calculates the sum of an amplitude of the first signal group and an amplitude of the second signal group, or the sum of a direct current component of the first signal group and a direct current component of the second signal group, as the first predetermined operation.

4. The apparatus according to claim 1, wherein the optical signal output device comprises:
    a scale, which is formed of first and second track patterns configured so that a direction parallel to a displacement direction of the displacement detection target is set as a longitudinal direction;
    a light source configured to irradiate a light beam to the scale; and
    a sensor head, which includes: a first photodetector detecting a light beam irradiated from the light source by means of the first track pattern to generate the first signal group; and a second photodetector detecting a light beam irradiated from the light source by means of the second track pattern to generate the second signal group, the first track pattern, the second track pattern, the first photodetector, the second photodetector and the light source being arranged so that detection by the first photodetector is associated with detection of the second photodetector.

5. The apparatus according to claim 4, wherein the first track pattern, the second track pattern, the first photodetector, the second photodetector and the light source are arranged so that the first component extracted by the first signal processing unit becomes approximately constant without depending on a displacement in a predetermined section of the displacement detection target.

6. An optical displacement detection system comprising:
    an optical signal output device comprising:
    (1) a scale, which is formed of first and second track patterns configured so that a direction parallel to a displacement direction of a displacement detection target is set as a longitudinal direction;
    (2) a light source configured to irradiate a light beam to the scale; and
    (3) a sensor head, which includes: a first photodetector detecting a light beam irradiated from the light source by means of the first track pattern to generate a first signal group in which an amplitude or direct current component gradually increases with a displacement of a predetermined direction of the displacement detection target; and a second photodetector detecting a light beam irradiated from the light source by means of the second track pattern to generate a second signal group in which an amplitude or direct current component gradually decreases with the displacement of the predetermined direction of the displacement detection target, the first track pattern, the second track pattern, the first photodetector, the second photodetector and the light source being arranged so that detection by the first photodetector is associated with detection of the second photodetector, and
    a signal processing apparatus comprising:
    (1) a first signal processing unit configured to execute a first predetermined operation with respect to the first and second signal groups and to extract a first component having a predetermined characteristic when the optical signal output device is in a normal state; and
    (2) a second signal processing unit configured to execute a second predetermined operation with respect to the first and second signal groups and to extract an output containing a second component, which is peculiar to an optional position of the displacement detection target, as a displacement of the displacement detection target.

7. The system according to claim 6, wherein the signal processing apparatus further comprises a notification unit configured to compare a first component actually extracted by the first signal processing unit with the predetermined characteristic to determine whether or not there is a difference between the first component and the predetermined characteristic, and to notify whether or not the optical signal output device is in a normal state in accordance with the compared result, or to notify a degree of the difference between the first component actually extracted by the first signal processing unit and the predetermined characteristic in accordance with the compared result.

8. The system according to claim 6, wherein the first signal processing unit calculates the sum of an amplitude of the first signal group and an amplitude of the second signal group, or the sum of a direct current component of the first signal group and a direct current component of the second signal group, as the first predetermined operation.

9. The system according to claim 6, wherein the first track pattern, the second track pattern, the first photodetector, the second photodetector and the light source are arranged so that the first component extracted by the first signal processing unit becomes approximately constant without depending on a displacement in a predetermined section of the displacement detection target.

10. The system according to claim 6, wherein the first and second track patterns are formed with a gray track formed of any of:
a grayscale pattern, which is an optical pattern such that any of an effective reflectance, an effective transmittance and a diffraction efficiency gradually increases or decreases in a predetermined section along a displacement direction of the displacement detection target; and
a modulation code pattern, which is a pattern having an optical characteristic such that the grayscale pattern and an encode pattern are combined, the encode pattern being an optical pattern such that any of an effective reflectance, an effective transmittance and a diffraction efficiency changes at a predetermined spatial period with respect to a direction along a displacement direction of the displacement detection target.

11. The system according to claim 10, wherein the first and second track patterns are formed with at least the modulation code pattern, and
the scale and the sensor head are arranged so that when a light beam irradiated from the light source is transmitted, reflected or diffracted by the modulation code pattern, a diffraction pattern having a spatial period pi is formed on light-receiving surfaces of the first and second photodetectors, and
a plurality of light-receiving element arrays, which has a spatial period same as the diffraction pattern of the spatial period pi or integer multiples of the spatial period, is arranged on light-receiving surfaces of the first and second photodetectors in a state of being shifted with respect to a direction along a displacement direction of the displacement detection target to detect the diffraction pattern at a mutually different spatial phase difference, and further
the signal processing apparatus further includes:
a plurality of channel in-phase adder unit configured to add outputs from the light-receiving element arrays receiving an in-phase component of the diffraction pattern of a plurality of light-receiving element arrays of first and second photodetectors; and
a relative displacement operation unit configured to calculate the displacement in combination with a plurality of channel outputs output from the in-phase adder unit.

* * * * *